US012052629B2

(12) United States Patent
Chaponniere et al.

(10) Patent No.: US 12,052,629 B2
(45) Date of Patent: Jul. 30, 2024

(54) USING SIDELINK BETWEEN VEHICLE-MOUNTED RELAYS TO OPTIMIZE USER EQUIPMENT MOBILITY

(71) Applicant: QUALCOMM Incorporated, San Diego, CA (US)

(72) Inventors: Lenaig Genevieve Chaponniere, La Jolla, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 17/322,309

(22) Filed: May 17, 2021

(65) Prior Publication Data

US 2021/0360505 A1 Nov. 18, 2021

Related U.S. Application Data

(60) Provisional application No. 63/026,421, filed on May 18, 2020.

(51) Int. Cl.
*H04W 36/30* (2009.01)
*H04W 4/40* (2018.01)
*H04W 36/00* (2009.01)
*H04W 36/32* (2009.01)
*H04W 92/18* (2009.01)

(52) U.S. Cl.
CPC ............ *H04W 36/32* (2013.01); *H04W 4/40* (2018.02); *H04W 36/0077* (2013.01); *H04W 36/00837* (2018.08); *H04W 92/18* (2013.01)

(58) Field of Classification Search
USPC ........................................................ 370/331
See application file for complete search history.

(56) References Cited

U.S. PATENT DOCUMENTS 8,457,143 B2 * 6/2013 Oh .......................... H04W 8/26
370/409
2013/0244569 A1 * 9/2013 Dunn ................. H04B 7/15507
455/11.1

(Continued)

FOREIGN PATENT DOCUMENTS

WO   WO-2017119919 A1 * 7/2017
WO   WO-2019016386 A1 * 1/2019 ......... H04B 7/18504

*Primary Examiner* — Gregory B Sefcheck
*Assistant Examiner* — Majid Esmaeilian
(74) *Attorney, Agent, or Firm* — Guang Yu Zhang; Patterson & Sheridan LLP

(57) ABSTRACT

Techniques and apparatus for using sidelinks for communications between vehicular mounted relays to improve user equipment (UE) mobility are described. In one technique, a first vehicle relay can receive information from a second vehicle relay via a sidelink. The information includes at least one of a location, a speed, or a direction of the second vehicle relay. The first vehicle relay determines to handover a UE served by the first vehicle relay to the second vehicle relay, based at least on the information, and triggers a handover of the UE to the second vehicle relay, in response to the determination. In another technique, a base station may receive the information from the first vehicle relay via radio resource control signaling, determine to handover the UE to the second vehicle relay, based at least on the information, and trigger a handover of the UE, in response to the determination.

24 Claims, 12 Drawing Sheets

(56) References Cited

U.S. PATENT DOCUMENTS

| | | | |
|---|---|---|---|
| 2015/0078333 A1* | 3/2015 | Byers | H04W 36/324 |
| | | | 370/331 |
| 2016/0138926 A1* | 5/2016 | Annapureddy | G01C 21/3423 |
| | | | 701/467 |
| 2018/0184339 A1* | 6/2018 | Hehn | H04W 36/08 |
| 2020/0162990 A1* | 5/2020 | Reimann | H04L 67/12 |
| 2020/0389832 A1* | 12/2020 | Otaka | H04W 36/34 |
| 2021/0360504 A1* | 11/2021 | Zhang | H04W 36/0016 |
| 2022/0191751 A1* | 6/2022 | Rune | H04W 36/0058 |

* cited by examiner

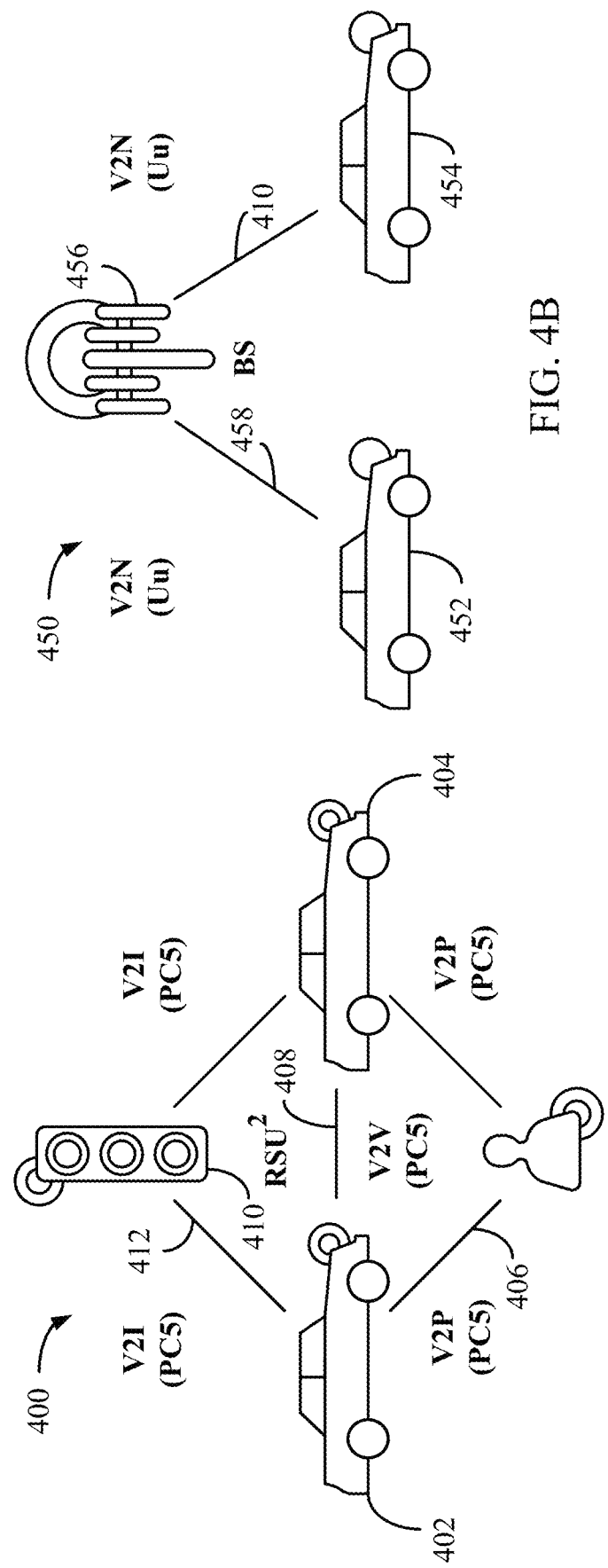

USING SIDELINK BETWEEN VEHICLE-MOUNTED RELAYS TO OPTIMIZE USER EQUIPMENT MOBILITY

CROSS-REFERENCE TO RELATED APPLICATION

This application claims the benefit of and priority to U.S. Provisional Application No. 63/026,421, filed May 18, 2020, which is assigned to the assignee hereof and hereby expressly incorporated by reference herein.

BACKGROUND

I. Field of the Disclosure

Aspects of the present disclosure relate to wireless communications, and more particularly, to techniques for using sidelink(s) between vehicle-mounted relays to optimize user equipment (UE) mobility.

II. Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between (mobile) UEs and vehicle mounted relays.

Certain aspects of the subject matter described in this disclosure can be implemented in a method for wireless communication performed by a first vehicle relay. The method generally includes receiving first information from at least one second vehicle relay via a sidelink for communications between the first vehicle relay and the at least one second vehicle relay. The first information includes at least one of a location, a speed, or a direction of the at least one second vehicle relay. The method also includes determining to handover a user equipment (UE) served by the first vehicle relay to the second vehicle relay, based at least in part on the first information. The method further includes triggering a handover of the UE from the first vehicle relay to the second vehicle relay, in response to the determination.

Certain aspects of the subject matter described in this disclosure can be implemented in an apparatus for wireless communication. The apparatus may include a receiver configured to receive first information from a vehicle relay via a sidelink for communications between the apparatus and the vehicle relay, the first information comprising at least one of a location, a speed, or a direction of the vehicle relay. The apparatus may also include a processing system, comprising: a memory comprising computer-executable instructions and one or more processors configured to execute the computer-executable instructions and cause the processing system to: determine to handover a user equipment (UE) served by the apparatus to the vehicle relay, based at least in part on the first information; and trigger a handover of the UE from the apparatus to the at least one vehicle relay, in response to the determination.

Certain aspects of the subject matter described in this disclosure can be implemented in an apparatus for wireless communication. The apparatus may include means for receiving first information from a vehicle relay via a sidelink for communications between the apparatus and the vehicle relay. The first information includes at least one of a location, a speed, or a direction of the vehicle relay. The apparatus also includes means for determining to handover a user equipment (UE) served by the apparatus to the vehicle relay, based at least in part on the first information. The apparatus further includes means for triggering a handover of the UE from the apparatus to the vehicle relay, in response to the determination.

Certain aspects can be implemented in a non-transitory computer-readable medium for wireless communication by a first vehicle relay. The non-transitory computer-readable medium may comprise computer-executable instructions that, when executed by one or more processors of a processing system, cause the first vehicle relay to: receive first information from at least one second vehicle relay via a sidelink for communications between the first vehicle relay and the at least one second vehicle relay, wherein the first information includes at least one of a location, a speed, or a direction of the at least one second vehicle relay; determine to handover a user equipment (UE) served by the first vehicle relay to the second vehicle relay, based at least in part on the first information; and trigger a handover of the UE from the first vehicle relay to the second vehicle relay, in response to the determination.

Certain aspects can be implemented in a computer program product for wireless communication by a first vehicle relay embodied on a computer-readable storage medium. The computer-readable storage medium may include code for: receiving first information from at least one second vehicle relay via a sidelink for communications between the first vehicle relay and the at least one second vehicle relay, wherein the first information includes at least one of a location, a speed, or a direction of the at least one second vehicle relay; determining to handover a user equipment (UE) served by the first vehicle relay to the second vehicle relay, based at least in part on the first information; and triggering a handover of the UE from the first vehicle relay to the second vehicle relay, in response to the determination.

Certain aspects of the subject matter described in this disclosure can be implemented in a method for wireless communication performed by a base station. The method generally includes receiving first information from a first vehicle relay served by the base station via radio resource control (RRC) signaling. The first information includes at least one of a location, a speed, or a direction of a second vehicle relay served by the base station, and was acquired by the first vehicle relay from the second vehicle relay via a sidelink for communications between the first vehicle relay and the second vehicle relay. The method also includes determining to handover a user equipment (UE) served by the first vehicle relay to the second vehicle relay, based at least in part on the first information. The method further includes triggering a handover of the UE from the first vehicle relay to the second vehicle relay, in response to the determination.

Certain aspects of the subject matter described in this disclosure can be implemented in an apparatus for wireless communication. The apparatus may include a receiver configured to receive first information from a first vehicle relay served by the apparatus via radio resource control (RRC) signaling. The first information includes at least one of a location, a speed, or a direction of a second vehicle relay served by the apparatus, and was acquired by the first vehicle relay from the second vehicle relay via a sidelink for communications between the first vehicle relay and the second vehicle relay. The apparatus may also include a processing system, comprising: a memory comprising computer-executable instructions and one or more processors configured to execute the computer-executable instructions and cause the processing system to: determine to handover a user equipment (UE) served by the first vehicle relay to the second vehicle relay, based at least in part on the first information; and trigger a handover of the UE from the first vehicle relay to the second vehicle relay, in response to the determination.

Certain aspects of the subject matter described in this disclosure can be implemented in an apparatus for wireless communication. The apparatus generally includes means for receiving first information from a first vehicle relay served by the apparatus via radio resource control (RRC) signaling. The first information includes at least one of a location, a speed, or a direction of a second vehicle relay served by the apparatus, and was acquired by the first vehicle relay from the second vehicle relay via a sidelink for communications between the first vehicle relay and the second vehicle relay. The apparatus may also include means for determining to handover a user equipment (UE) served by the first vehicle relay to the second vehicle relay, based at least in part on the first information, and means for triggering a handover of the UE from the first vehicle relay to the second vehicle relay, in response to the determination.

Certain aspects can be implemented in a non-transitory computer-readable medium for wireless communication by a base station. The non-transitory computer-readable medium may comprise computer-executable instructions that, when executed by one or more processors of a processing system, cause the base station to: receive first information from a first vehicle relay served by the base station via radio resource control (RRC) signaling, wherein the first information includes at least one of a location, a speed, or a direction of a second vehicle relay served by the base station, and was acquired by the first vehicle relay from the second vehicle relay via a sidelink for communications between the first vehicle relay and the second vehicle relay; determine to handover a user equipment (UE) served by the first vehicle relay to the second vehicle relay, based at least in part on the first information; and trigger a handover of the UE from the first vehicle relay to the second vehicle relay, in response to the determination.

Certain aspects can be implemented in a computer program product for wireless communication by a base station embodied on a computer-readable storage medium. The computer-readable storage medium may include code for: receiving first information from a first vehicle relay served by the base station via radio resource control (RRC) signaling, wherein the first information includes at least one of a location, a speed, or a direction of a second vehicle relay served by the base station, and was acquired by the first vehicle relay from the second vehicle relay via a sidelink for communications between the first vehicle relay and the second vehicle relay; determining to handover a user equipment (UE) served by the first vehicle relay to the second vehicle relay, based at least in part on the first information; and triggering a handover of the UE from the first vehicle relay to the second vehicle relay, in response to the determination.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 4A, 4B, and 4C show diagrammatic representations of example vehicle to everything (V2X) systems, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
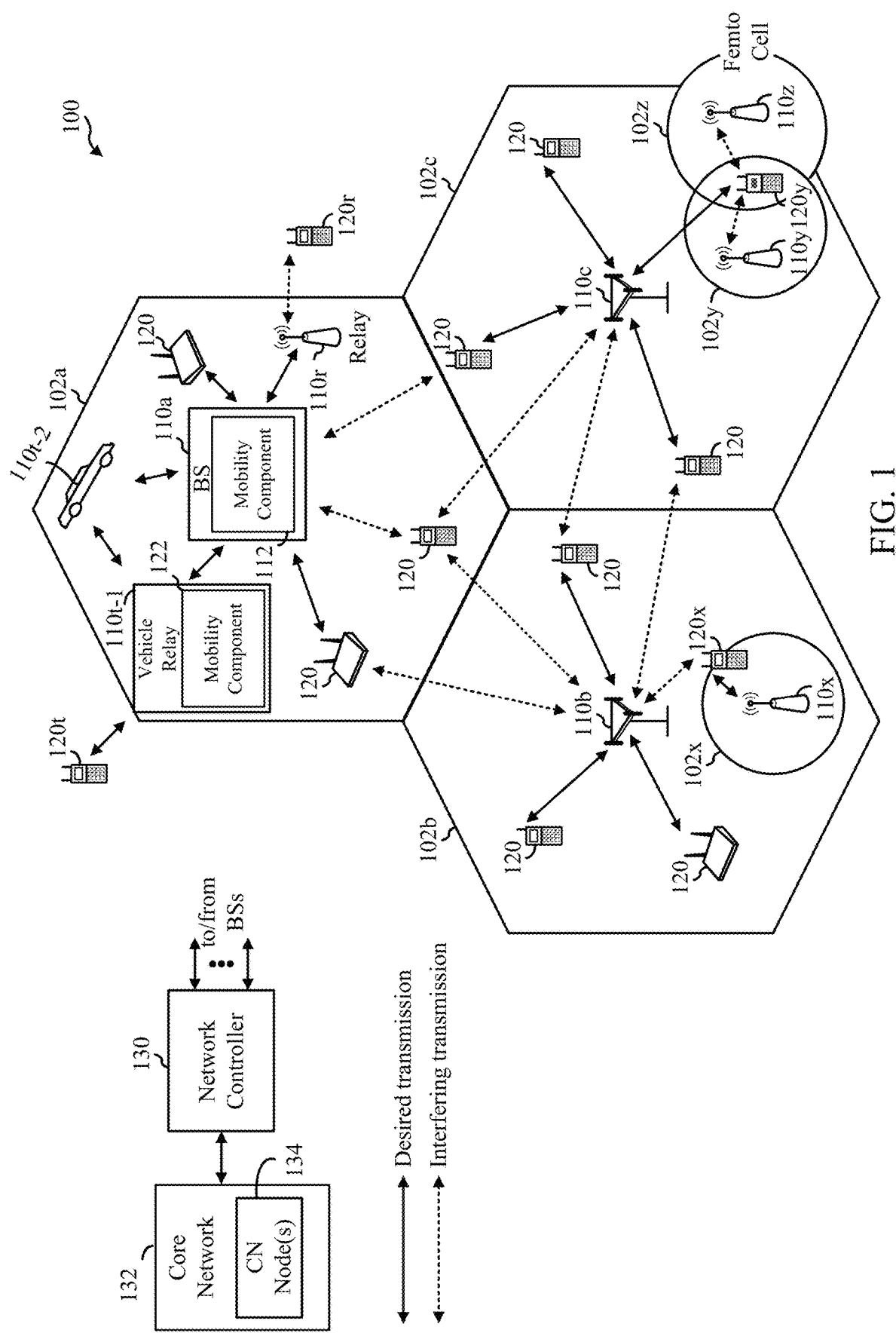
FIG. 1 is a block diagram conceptually illustrating an example telecommunications system, in accordance with certain aspects of the present disclosure.

Aspects of the present disclosure provide apparatus, methods, processing systems, and computer readable mediums for using sidelinks (also referred to as direct links) (e.g., PC5 link/interface) used for (direct) communications between UEs and vehicle mounted relays and/or between different vehicle mounted relays to improve UE mobility within a network.

In communication systems (e.g., 5G NR) that support sidelink communications, certain devices may exchange data with other devices directly and without the help (e.g., relaying) of a base station. For example, a UE may exchange data directly with another UE and/or a relay without the help of a base station. In another example, a relay may exchange data directly with another relay without the help of a base station. This type of sidelink communication is often called peer-to-peer (also referred to as device-to-device or D2D) communication. An example of peer-to-peer communication includes vehicle to everything (V2X) communication where a vehicle may communicate with another vehicle (V2V) or a different device, such as a UE of a pedestrian/person (V2P), a traffic control system, etc.

In some communication system deployments, relays may be mounted in (or onto) vehicles (referred to herein as a vehicle relay). The vehicle relays may communicate with stationary gNBs from the macro network (referred to as donor gNBs) and may provide coverage to neighboring UEs that may be within a given vehicle or within vicinity of the vehicle relays. In some cases, a vehicle relay can be mounted within a vehicle having a known travel path (e.g., a bus, a tram, etc.). In some cases, a vehicle relay can be mounted within a vehicle with a variable travel path (e.g., a taxi, end-user car, etc.). In some aspects, one or more vehicle relays within a communication system can be used to provide coverage and/or capacity extension in a dense environment (e.g., urban area).

One issue with such communication system deployments is that UE mobility is typically facilitated via the donor gNBs. That is, the UE is generally handed over between the different vehicle relays based on communications exchanged over radio links between the relay and the donor gNB (e.g., Uu NR). Performing handovers over these radio links can lead to increased latency, and thus may not be sufficient for deployments with highly mobile UEs and vehicle relays.

To address this, aspects presented herein provide techniques for using sidelinks (also referred to as direct links) between vehicle relays to improve UE mobility. In particular, one or more sidelinks can be used to communicate information used for making UE handover decisions and triggering handovers of UEs to different vehicle relays. One example of a sidelink that can be employed is the PC5 link (or interface). Note, however, that a sidelink can be implemented using other types of links (or interfaces).

In one embodiment described herein, a first vehicle relay serving a UE may determine to handover the UE to a second vehicle relay based on information received from the second vehicle relay via a sidelink (e.g., PC5 link/interface) used for communication between the first vehicle relay and the second vehicle relay. The information may indicate at least one of a speed of the second vehicle relay, a location of the second vehicle relay, a travel path of the second vehicle relay, a capacity (or load) of the second vehicle relay, etc. By using sidelink(s) to communicate information used for UE mobility decisions, aspects presented herein can significantly reduce latency associated with UE handovers, which in turn, can improve the performance of the network in high mobility scenarios.

The following description provides examples of UE mobility among vehicle relays in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices. Further, in some aspects, wireless communication network 100 may also include one or more vehicular mounted relays (e.g., vehicular relay 110t-1) that receive a transmission of data and/or other information from an upstream station (e.g., a BS 110a or UE 120t) and sends a transmission of the data and/or other information to a downstream station (e.g., UE 120t or BS 110a) and/or relays the transmission to another vehicular relay (e.g., vehicle relay 110t-2).

The vehicle relays 110t and/or UEs 120t may communicate directly with each other via sidelinks (e.g., PC5 links). For example, vehicle relay 110t-1 may communicate directly with UE 120t via a first sidelink used for communication between the vehicle relay 110t-1 and UE 120t. Likewise, the vehicle relay 110t-1 may communicate directly with vehicle relay 110t-2 via a second sidelink used for communication between the vehicle relay 110t-1 and vehicle relay 110t-2.

As shown, the vehicle relay 110t-1 includes a mobility component 122, which is configured to implement one or more techniques described herein for improving UE mobility based on communications exchanged via one or more sidelinks. In some aspects, the vehicle relay 110t-1 (using the mobility component 122) may receive information from vehicle relay 110t-2 via a sidelink for communications between vehicle relay 110t-1 and vehicle relay 110-2. The information may indicate at least one of a location, a speed, or a direction of vehicle relay 110t-2. The vehicle relay 110t-1 (using mobility component 122) may determine whether to handover UE 120t served by vehicle relay 110t-1 to vehicle relay 110*t*-2, based at least in part on the information. Upon determining to handover UE 120*t*, the vehicle relay 110*t*-1 (Using mobility component 122) may trigger a handover of the UE 120*t* from vehicle relay 110*t*-1 to vehicle relay 110*t*-2, in response to the determination.

As also shown, BS 110*a* includes a mobility component 112, which is configured to implement one or more techniques described herein for improving UE mobility based on communications exchanged via one or more sidelinks. In some aspects, the BS 110*a* (using mobility component 112) may receive information from vehicle relay 110*t*-1 served by BS 110*a* via radio resource control (RRC) signaling. The information may include at least one of a location, a speed, or a direction of vehicle relay 110*t*-2 (which may be served by BS 110*a*). The information may have been acquired by vehicle relay 110*t*-1 from vehicle relay 110*t*-2 via a sidelink used for communications between vehicle relay 110*t*-1 and vehicle relay 110*t*-2. The BS 110*a* (using mobility component 112) may determine to handover UE 120*t* served by vehicle relay 110*t*-1 to the vehicle relay 110*t*-2, based at least in part on information. Upon determining to handover the UE 120*t*, the BS 110*a* (using mobility component 112) may trigger a handover of UE 120*t* from vehicle relay 110*t*-1 to vehicle relay 110*t*-2, in response to the determination.

Figure 2:
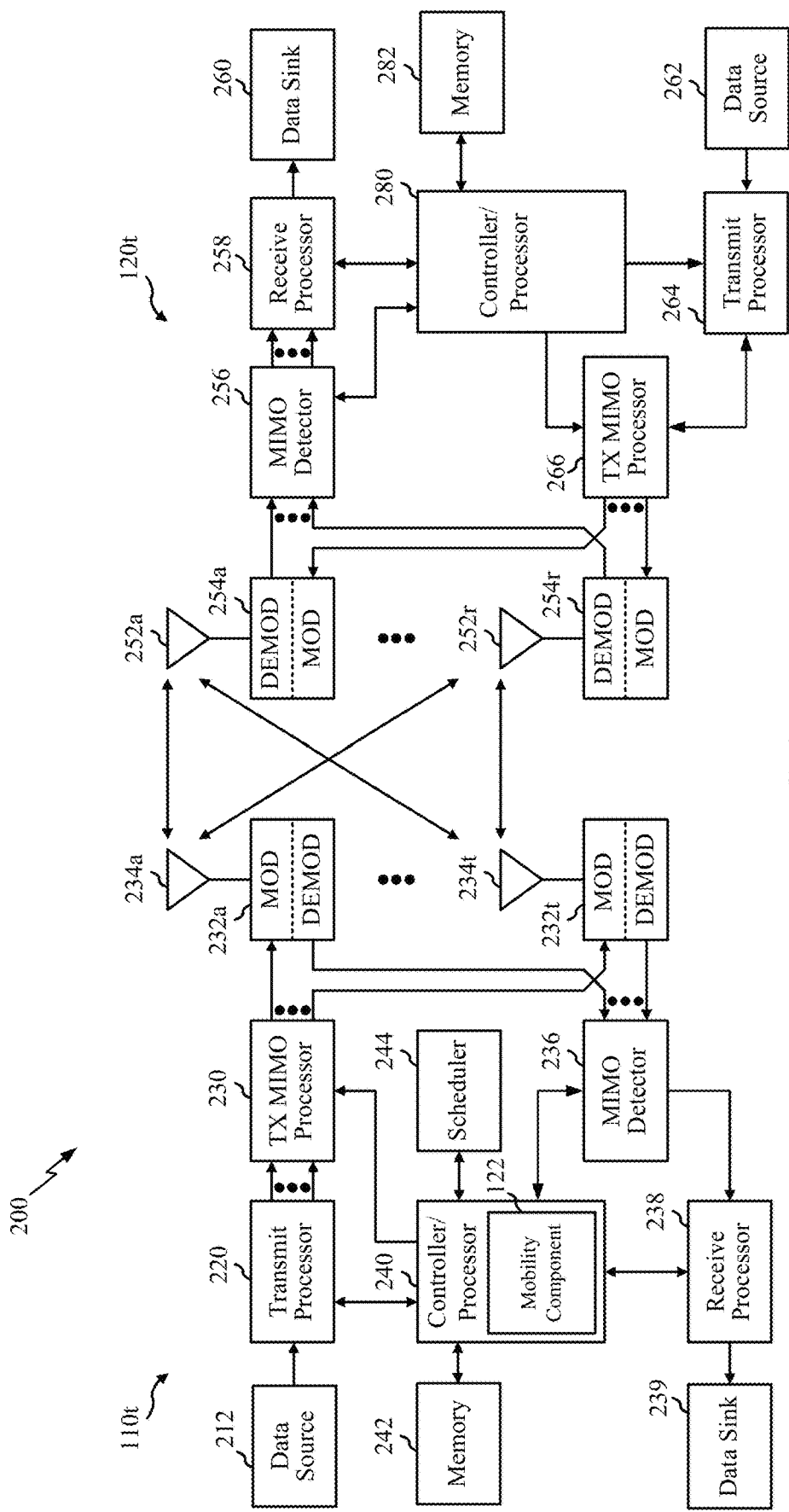
FIG. 2 is a block diagram conceptually illustrating a design of an example a base station (BS) and user equipment (UE), in accordance with certain aspects of the present disclosure.

FIG. 2 illustrates example components of vehicle relay 110*t* and UE 120*t* (e.g., in the wireless communication network 100 of FIG. 1), which may be used to implement aspects of the present disclosure.

At the vehicle relay 110*t*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*t*, the antennas 252*a*-252*r* may receive the downlink signals from the vehicle relay 110*t* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120*t* to a data sink 260, and provide decoded control information to a controller/processor 280.

On the uplink, at UE 120*t*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM, etc.), and transmitted to the vehicle relay 110*t*. At the vehicle relay 110*t*, the uplink signals from the UE 120*t* may be received by the antennas 234, processed by the modulators 232, detected by a MIMO detector 236 if applicable, and further processed by a receive processor 238 to obtain decoded data and control information sent by the UE 120*t*. The receive processor 238 may provide the decoded data to a data sink 239 and the decoded control information to the controller/processor 240.

The memories 242 and 282 may store data and program codes for vehicle relay 110*t* and UE 120*t*, respectively. A scheduler 244 may schedule UEs for data transmission on the downlink and/or uplink.

Antennas 252, processors 266, 258, 264, and/or controller/processor 280 of the UE 120*t* and/or antennas 234, processors 220, 230, 238, and/or controller/processor 240 of the vehicle relay 110*t* may be used to perform the various techniques and methods described herein. For example, as shown in FIG. 2, the controller/processor 240 of the vehicle relay 110*t* has a mobility component 122, which may be configured to implement one or more techniques described herein. Although not shown, in some aspects, the BS 110*a* may include similar components (e.g., antennas, processors, controller/processor, etc.) as vehicle relay 110*t* to implement one or more techniques described herein. For example, as noted above the BS 110*a* may include a mobility component 112 to implement one or more techniques described herein. Although shown at the controller/processor, other components of the UE 120*t* and vehicle relay 110*t* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
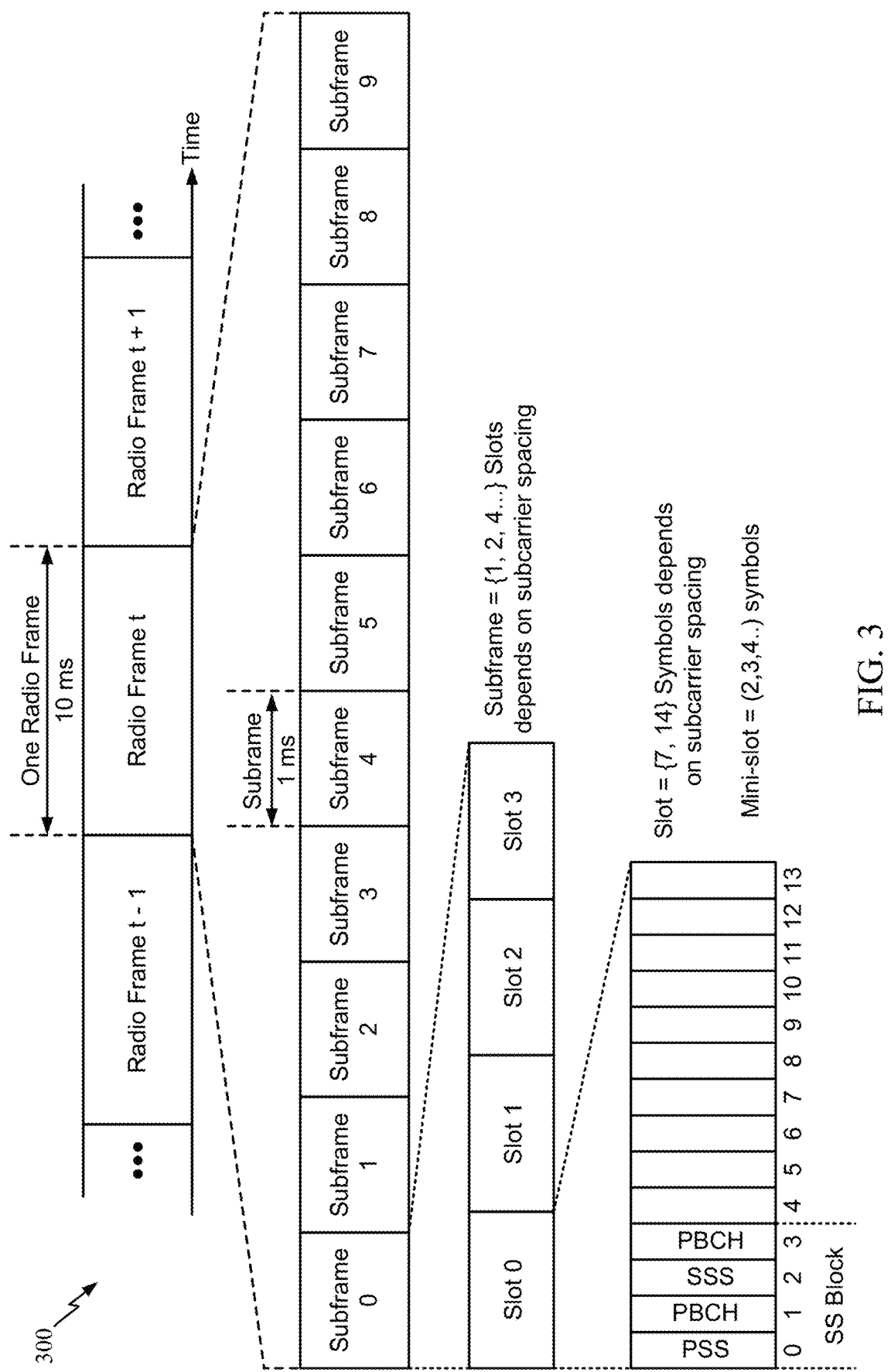
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120t, as shown in FIG. 1) to another subordinate entity (e.g., vehicle relay 110t-1) without relaying that communication through the scheduling entity (e.g., BS 110a), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling, such as sidelink resource configurations and other parameters used for data transmissions, and the PSSCH may carry the data transmissions. The PSFCH may carry sidelink feedbacks, such as distance-based and/or non-distance-based HARQ feedbacks related to data transmissions between two or more UEs that are in direct communication with each other.

Figure 4C:
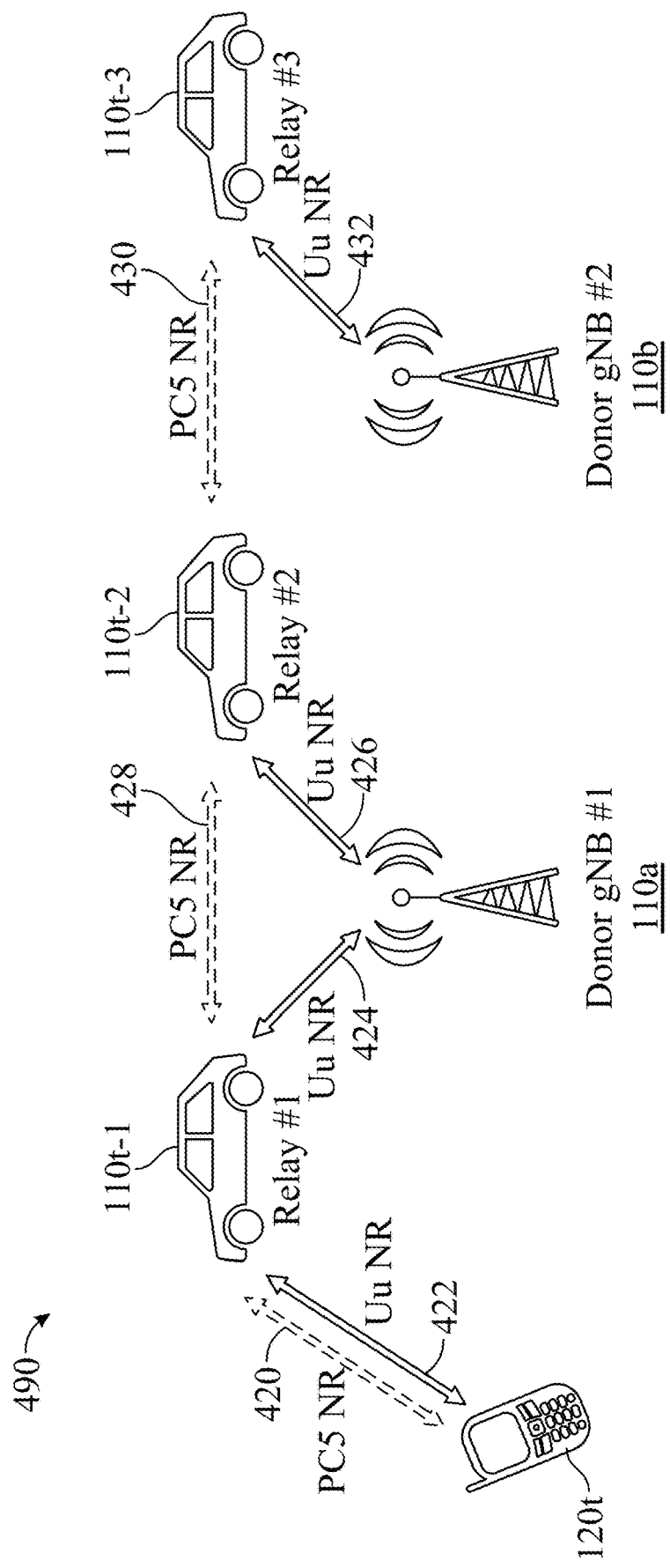

FIG. 4A, FIG. 4B, and FIG. 4C show diagrammatic representations of example V2X systems, in accordance with some aspects of the present disclosure. For example, the vehicles shown in FIGS. 4A-4C may perform data transmissions via sidelinks, as described herein.

The V2X systems that are shown in FIG. 4A and FIG. 4B provide two complementary transmission modes. A first transmission mode, shown by way of example in FIG. 4A, may involve direct communications (may also be referred to as sidelink communications) between participants in proximity to one another in a local area. Sidelink transmissions by the UEs (e.g., Vehicles 402 and 404, or RSU$^2$ (e.g., traffic light) 410) may be implemented over a PC5 interface (e.g., a wireless communication interface between a first UE and a second UE). A second transmission mode, shown by way of example in FIG. 4B, may involve network communications through a network, which may be implemented over a Uu interface (e.g., a wireless communication interface between a radio access network (RAN) and a UE).

Referring to FIG. 4A, a V2X system 400 (e.g., vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (e.g., with a mobile phone of the individual) through a PC5 interface. Communications between the vehicles 402 and 404 may also occur through a PC5 interface 408. In a like manner, communication may occur from a vehicle 402 to other highway components (e.g., highway component 410), such as a traffic signal or sign (V2I) through a PC5 interface 412. With respect to each communication link illustrated in FIG. 4A, two-way communication may take place between elements, therefore each element may be a transmitter and a receiver of information.

The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed and/or unlicensed spectrum, thus any vehicle with an equipped system may access a common frequency and share information. Such harmonized/common spectrum operations may allow for safe and reliable operations.

FIG. 4B shows a V2X system 450 for communication between a vehicle 452 and a vehicle 454 through a network entity 456. These network communications may occur through discrete nodes, such as a B S (e.g., the BS 110a shown in FIG. 1), that sends and receives information to and from (or relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

FIG. 4C shows a V2X system 490 having one or more vehicle relays 110t deployed to provide coverage for V2Ps (e.g., UE 120t). As shown, the vehicle relays 110t may communicate among each other via sidelinks. For example, vehicle relay 110t-1 may have a wireless communication link 428 with vehicle relay 110t-2 via a PC5 interface, and vehicle relay 110t-2 may have a wireless communication link 430 with vehicle relay 110t-3 via a PC5 interface. In some aspects, a vehicle relay 110t may communicate with one or more UEs via sidelinks and/or access links. For example, vehicle relay 110t-1 may have a wireless communication link 420 with UE 120t via a PC5 interface and/or a wireless communication link 422 with UE 120t via a Uu interface. In some aspects, the vehicle relays 110t may communicate with base stations via access links. For example, vehicle relay 110t-1 may have a wireless communication link 424 with donor gNB 110a via a Uu interface, vehicle relay 110t-2 may have a wireless communication link 426 with donor gNB 110a via a Uu interface, and vehicle relay 110t-3 may have a wireless communication link 432 with donor gNB 110b via a Uu interface.

As noted above, one issue with the deployment depicted in FIG. 4C is that information used for UE mobility decisions is typically exchanged over access links (e.g., wireless communication links 422, 424, 426, 432), impacting latency in high mobility scenarios with several vehicle relays 110t and UEs 120t. Accordingly, it may be desirable to provide techniques and apparatus for optimizing UE mobility in such scenarios.

Example Optimization of UE Mobility Based on Using Sidelink Between Vehicle-Mounted Relays Aspects presented herein provide techniques for using sidelink(s) (e.g., one or more PC5 links/interfaces) between vehicle mounted relays to improve the mobility of UEs served by the vehicle mounted relays within the network. In some aspects, for example, the sidelink(s) between vehicle relays can be used to indicate to neighboring vehicle relay(s), a given vehicle relay's identifier (vehicle relay ID), a capacity (or load) of the vehicle relay (indicating whether the vehicle relay can serve an additional UE), a location of the vehicle relay, a speed of the vehicle relay, a direction (or heading) of the vehicle relay, a travel path of the vehicle relay, etc.

In one aspect, this information exchanged over one or more sidelinks can be evaluated locally at the (serving) vehicle relay to determine whether to handover the UE to a (target) vehicle relay. In another aspect, this information exchanged over one or more sidelinks can be transmitted to a donor gNB-central unit (gNB-CU), which can determine whether to handover the UE from a (serving) vehicle relay to a (target) vehicle relay.

Figure 5:
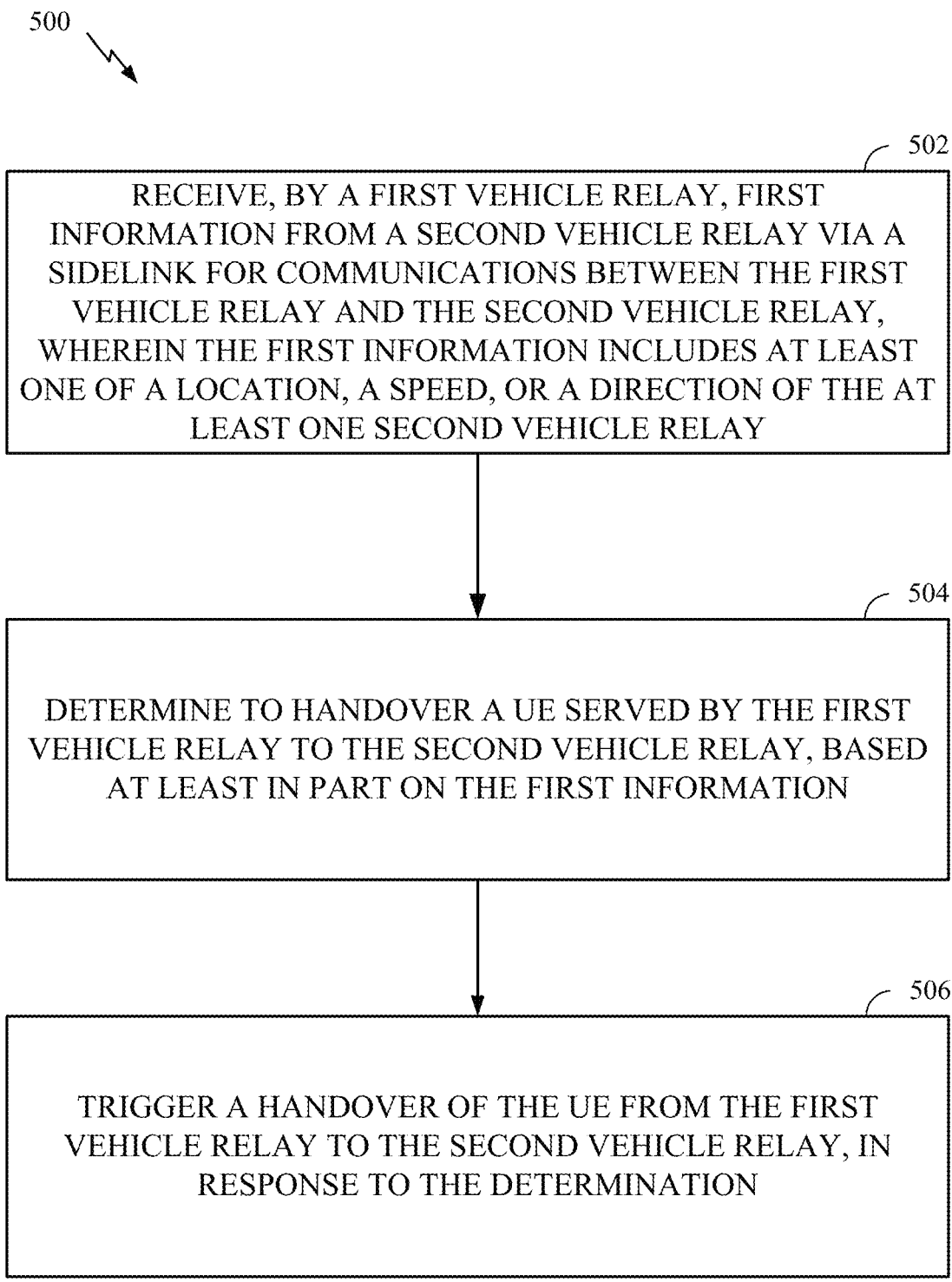
FIG. 5 is a flow diagram of example operations by a serving vehicle relay, in accordance with certain aspects of the present disclosure.

FIG. 5 is a flow diagram illustrating example operations 500 for wireless communication, in accordance with certain aspects of the present disclosure. The operations 500 may be performed, for example, by a vehicle relay (e.g., the vehicle relay 110t-1 in the wireless communication network 100). Operations 500 may be implemented as software components that are executed and run on one or more processors (e.g., controller/processor 240 of FIG. 2). Further, the transmission and reception of signals by the vehicle relay in operations 500 may be enabled, for example, by one or more antennas (e.g., antennas 234 of FIG. 2). In certain aspects, the transmission and/or reception of signals by the vehicle relay may be implemented via a bus interface of one or more processors (e.g., controller/processor 240) obtaining and/or outputting signals.

The operations 500 may begin, at 502, where the (first) vehicle relay receives first information from at least another (second) vehicle relay via a sidelink for communications between the vehicle relay and the other vehicle relay. The first information may include at least one of a location of the other vehicle relay, a speed of the other vehicle relay, or a direction of the other vehicle relay. In one aspect, the sidelink includes a PC5 interface.

At 504, the vehicle relay determines to handover a UE served by the vehicle relay to the other vehicle relay, based at least in part on the first information. At 506, the vehicle relay triggers a handover of the UE from the vehicle relay to the other vehicle relay, in response to the determination.

Figure 6A:
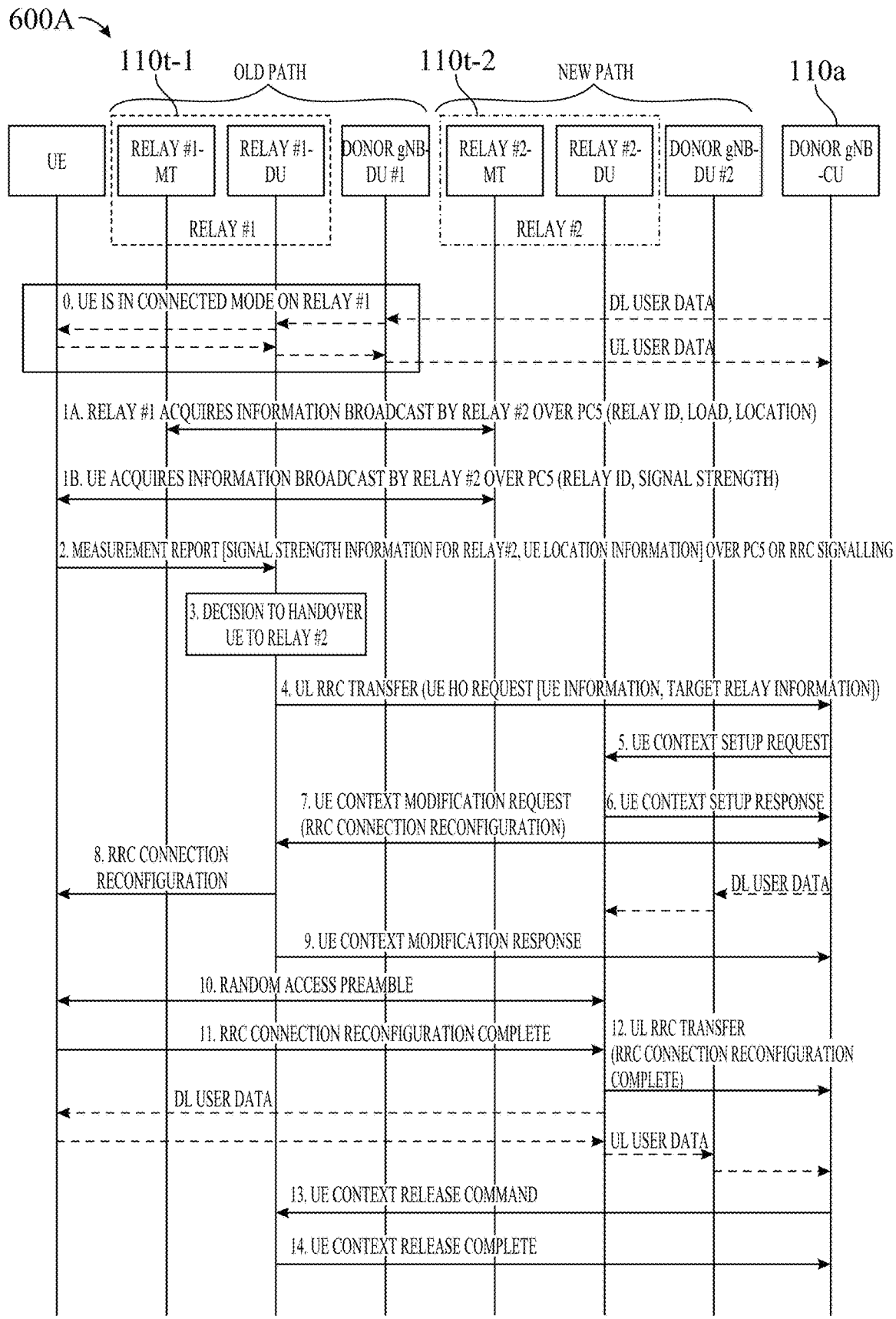
FIGS. 6A-6B depict call flows for triggering a UE handover by a serving vehicle relay, in accordance with certain aspects of the present disclosure.

In some aspects, the (first) vehicle relay may determine, at the first vehicle relay (e.g., locally), to handover the UE to the other (second) vehicle relay. FIG. 6A illustrates a call flow 600A for determining, at the serving vehicle relay, to handover the UE to a target vehicle relay, in accordance with certain aspects of the present disclosure. Here, the vehicle relay 110t-1 and the vehicle relay 110t-2 each include a mobile terminated (MT) component and a distributed unit (DU) component. In one aspect, the MT component and the DU component may be implemented in accordance with Integrated Access and Backhaul (IAB) defined in 3GPP. For example, the vehicle relays 110t-1 and 110t-2 may be IAB-nodes that host a MT function and a DU function. The MT function may provide a sidelink connection (e.g., via PC5) to UE(s) and/or other MT functions of other vehicle relays. The DU function may provide an access connection (e.g., via Uu) to UE(s) and/or a donor BS (e.g., donor gNB DU and/or donor gNB CU).

As shown, the UE may initially be served by the vehicle relay 110t-1. For example, at step 0, the UE is initially in a connected mode with the first vehicle relay 110t-1. Subsequently, at step 1a, the (MT function of) vehicle relay 110t-1 acquires information broadcast by the (MT function of) vehicle relay 110t-2 over a sidelink used for communication between vehicle relay 110t-1 and vehicle relay 110t-2 (e.g., PC5). In some aspects, the neighboring vehicle relay(s) (e.g., vehicle relay 110t-2) may use PC5 messages (e.g., V2X messages, such as basic safety messages (BSM), or intention sharing messages, etc.) to indicate the information. In addition to (or in alternative to) step 1a, the vehicle relay 110t-1 may use ranging over the sidelink (e.g., PC5) to estimate at least some information (e.g., location, speed, heading, etc.) regarding vehicle relay 110t-2. For example, the vehicle relay 110t-1 may use ranging over PC5 to estimate the distance between itself and other vehicle relays (e.g., the vehicle relay 110t-2).

The information may include an identifier of vehicle relay 110t-2 (e.g., relay ID), the load/capacity of vehicle relay 110t-2, the location of vehicle relay 110t-2, the speed of vehicle relay 110t-2, heading/direction of vehicle relay 110t-2, travel path of vehicle relay 110t-2, etc. In some aspects, the load/capacity of vehicle relay 110t-2 can be indicated via a percentage (e.g., vehicle relay 110t-2 has 40% capacity for new UEs, vehicle relay 110t-2 has 60% current load, etc.). In some aspects, the load/capacity of vehicle relay 110t-2 can be a yes/no indication (e.g., indicating whether the vehicle relay 110t-2 can/cannot serve new UEs).

In some aspects, the travel path of vehicle relay 110t-2 may be a predefined travel path for vehicle relay 110t-2. For example, if vehicle relay 110t-2 is a bus, the travel path may be a bus route for the bus. In another example, if vehicle relay 110t-2 is a tram, the travel path may be a path of the tramway track. In yet another example, if the vehicle relay 110t-2 is an end user vehicle (e.g., vehicle for hire, personal vehicle, etc.), the travel path may be based on GPS navigation information for a particular destination of the end user vehicle, a street grid, etc.

At step 1b, the UE acquires information broadcast from the (MT function of) vehicle relay 110t-2 over a sidelink (e.g., PC5) used for communication between the UE and vehicle relay 110t-2. The information acquired by the UE may include a relay ID of vehicle relay 110t-2, and a signal strength (measured by the UE) of the vehicle relay 110t-2.

At step 2, the UE sends a measurement report regarding vehicle relay 110t-2 to the vehicle relay 110t-1. The measurement report may include at least one of the signal strength information for vehicle relay 110t-2 or UE location information. The UE location information, for example, may indicate a location of the UE, a speed of the UE, a direction/heading of the UE, a travel path of the UE (e.g., GPS navigation plan for a particular destination), etc. In one aspect, the UE may send the measurement report/UE location report to the (DU function of) vehicle relay 110*t*-2, via RRC signaling (as shown in FIG. 6A). In one aspect (not shown), the UE may send the measurement report/UE location report to the (MT function of) vehicle relay 110*t*-2, via the sidelink (e.g., PC5) used for communication between the UE and the vehicle relay 110*t*-2 (e.g., assuming the UE supports V2P/P2V services). In some aspects, the (serving) vehicle relay 110*t*-1 may configure the UE to perform measurements on the (target) neighboring vehicle relay 110*t*-2 (e.g., based on the information received in step 1*a*).

At step 3, the vehicle relay 110*t*-1 determines based at least in part on the information acquired at step 1*a* or the measurement report acquired at step 2 to handover the UE to vehicle relay 110*t*-2. In one aspect, the vehicle relay 110*t*-1 may select vehicle relay 110*t*-2 to handover the UE to from a plurality of neighboring vehicle relays. For example, the vehicle relay 110*t*-1 may determine (e.g., extrapolate) an expected trajectory of one or more neighboring relays that can serve new UEs (e.g., using information acquired in steps 1*a* and 2). For instance, the extrapolation may be based on previous locations, known paths (e.g., street grid, bus routes, tramway tracks, etc.), speed, direction, and path plans of neighboring relay(s). The vehicle relay 110*t*-2 may also determine (e.g., extrapolate) an expected trajectory of the UE (e.g., based on previous locations reported by the UE, travel path, speed, direction, etc.).

The vehicle relay 110*t*-2 may then select the vehicle relay 110*t*-2 as the target vehicle relay, based on the expected trajectory of the vehicle relay 110*t*-2 and the expected trajectory of the UE. For example, the vehicle relay 110*t*-2 may make the handover decision based on expected trajectory and speed of neighboring vehicle relay(s) which can serve new UEs, the expected trajectory and speed of the UE, and neighboring vehicle relay(s) and associated signal strength(s) reported by the UE. The UE may select (from a plurality of neighboring vehicle relay(s) that can serve new UEs) the vehicle relay (e.g., vehicle relay 110*t*-2) whose trajectory will overlap with the trajectory of the UE for the longest duration).

In one aspect, the handover of the UE from vehicle relay 110*t*-1 to vehicle relay 110*t*-2 is triggered via the vehicle relay 110*t*-1 sending a request to the donor gNB-CU to handover the UE to the vehicle relay 110*t*-2. For example, as shown in step 4 of FIG. 6A, the (DU function of) vehicle relay 110*t*-1 sends a UL RRC Transfer that includes a UE HO request to the donor gNB-CU. The UE HO request includes UE information (e.g., UE location information, UE identifier, etc.) and target vehicle relay information (e.g., relay ID, load, location information, etc.). In one aspect, the UL RRC Transfer may use new DU-CU signaling. For example, an F1-AP message update may be used for the UL RRC Transfer.

The UL RRC Transfer triggers the donor gNB-CU to handover the UE to the target vehicle relay 110*t*-2 using existing UE HO procedures (e.g., specified in Rel 15 3GPP). For example, as shown, at step 5, the donor gNB-CU sends a UE context step request to the vehicle relay 110*t*-2. At step 6, the vehicle relay 110*t*-2 send a UE context setup response to the donor gNB-CU. At step 7, the donor gNB-CU sends a UE context modification request (including a RRC Connection Reconfiguration message) to the vehicle relay 110*t*-1, which (at step 8) forwards the RRC Connection Reconfiguration message to the UE. At step 9, the vehicle relay 110*t*-1 sends a UE Context modification response to the donor gNB-CU. A random access procedure is then performed between the UE and the vehicle relay 110*t*-2. For example, at step 10, the UE sends a random access preamble to the vehicle relay 110*t*-2, and at step 11, the UE sends a RRC Connection Reconfiguration Complete message to the vehicle relay 110*t*-2. At step 12, the vehicle relay 110*t*-2 forwards the RRC Connection Reconfiguration Complete message to the donor gNB-CU. The UE Context is then released from the vehicle relay 110*t*-2 (e.g., via the UE Context Release Command and UE Context Release Complete in steps 13-14, respectively).

Figure 6B:
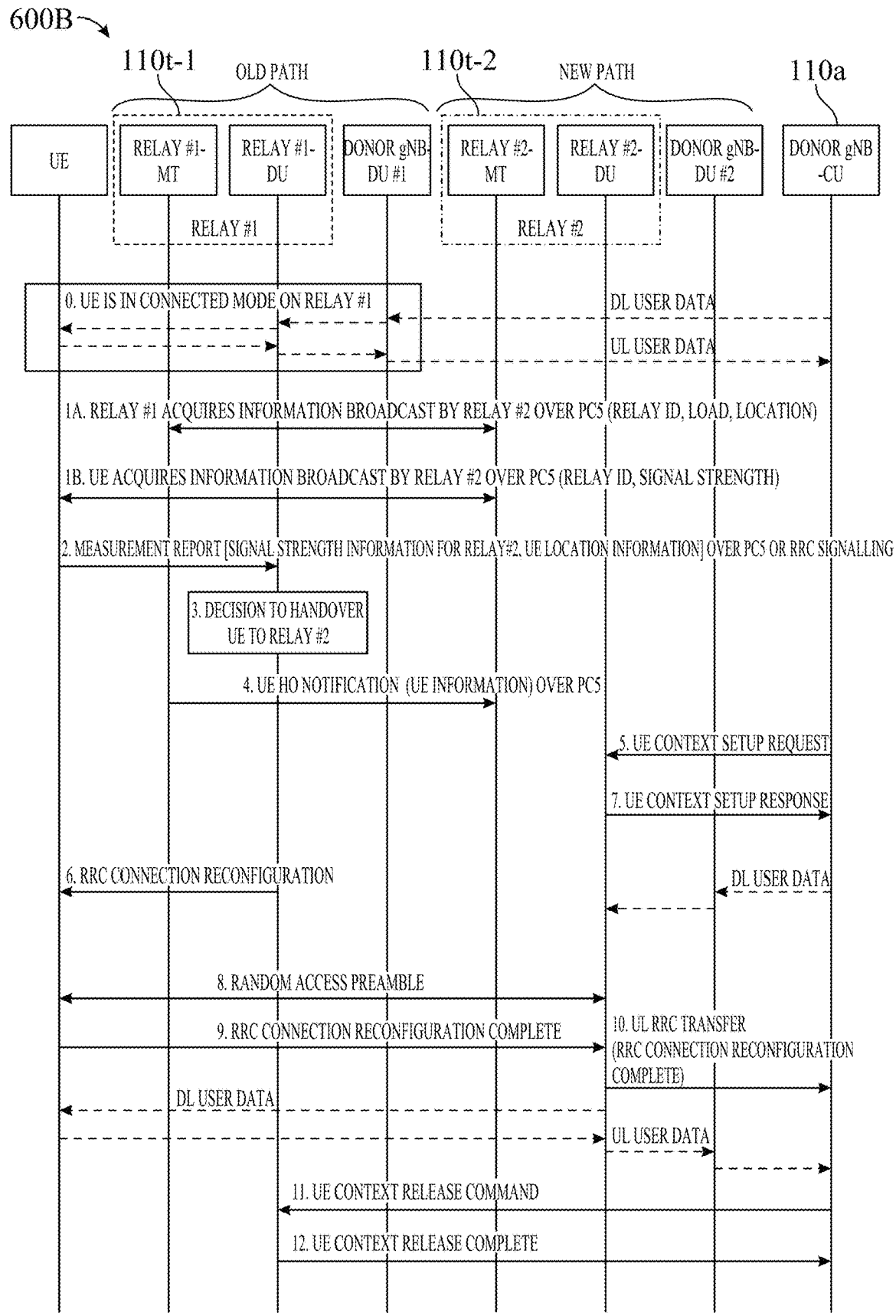

FIG. 6B illustrates a call flow 600B for determining, at the serving vehicle relay, to handover the UE to a target vehicle relay, in accordance with certain aspects of the present disclosure. Here, compared to the call flow 600A, the handover of the UE is triggered via the (serving) vehicle relay 110*t*-1 (1) generating and sending (at the serving vehicle relay) a RRC Connection Reconfiguration message to the UE and (2) sending a handover notification message to the (target) vehicle relay 110*t*-2 over a sidelink (e.g., PC5) used for communication between the vehicle relay 110*t*-1 and vehicle relay 110*t*-2. For example, as shown, after the determination to handover the UE to vehicle relay 110*t*-2 (step 3), the (MT function of) vehicle relay 110*t*-1 sends a UE HO Notification (including UE information) to the (MT function of) vehicle relay 110*t*-2 over the sidelink used for communication between the vehicle relay 110*t*-1 and vehicle relay 110*t*-2. The UE HO Notification triggers the vehicle relay 110*t*-2 to send a UE Context Setup Request to the donor gNB-CU (step 5). In one aspect, the vehicle relay 110*t*-2 may send the UE Context Setup Request to the donor gNB-CU using new DU-CU signaling. For example, in one case, the vehicle relay 110*t*-2 can use a F1-AP message update to send the UE Context Setup Request. At step 7, the donor gNB-CU responds with a UE Context Setup Response.

As also shown, after the determination to handover the UE to vehicle relay 110*t*-2 (step 3), the (DT function of) the vehicle relay 110*t*-1 generates (at the vehicle relay 110*t*-1) a RRC Connection Reconfiguration message, and sends the RRC Connection Reconfiguration message to the UE (step 6). That is, rather than forwarding a RRC Connection Reconfiguration message received from another entity, the vehicle relay 110*t*-1 in this aspect generates the RRC Connection Reconfiguration message itself After receiving the RRC Connection Reconfiguration message, the UE may send a random access preamble (step 8) and RRC Connection Reconfiguration Complete message (step 9) to the vehicle relay 110*t*-2, which forwards the RRC Connection Reconfiguration Complete message to the donor gNB-CU (step 10). The UE Context is then released from vehicle relay 110*t*-1 (via steps 11-12).

Figure 7:
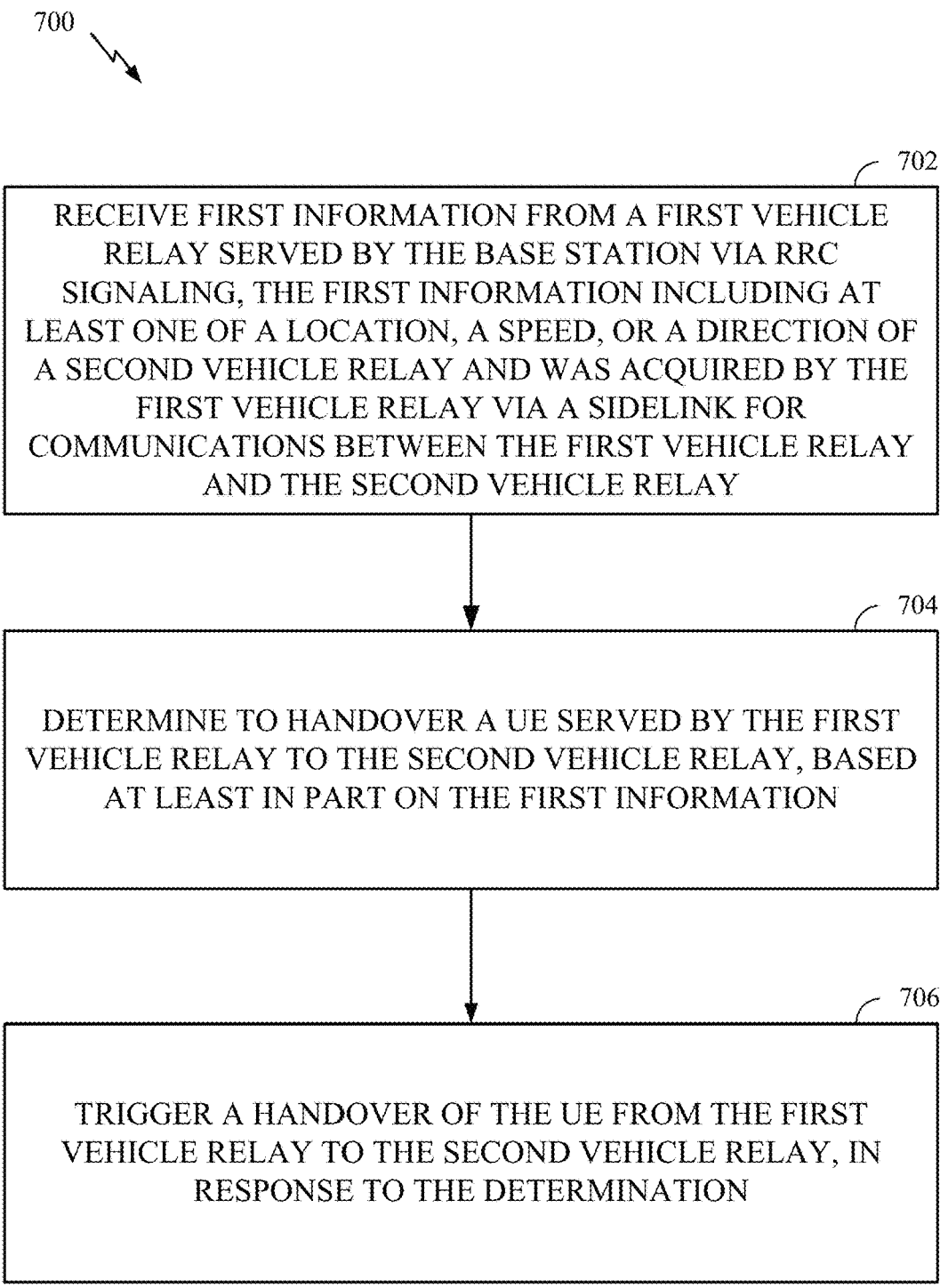
FIG. 7 is a flow diagram of example operations by a donor base station, in accordance with certain aspects of the present disclosure.

FIG. 7 is a flow diagram illustrating example operations 700 for wireless communication, in accordance with certain aspects of the present disclosure. The operations 700 may be performed, for example, by a base station (e.g., the base station 110*a* in the wireless communication network 100). In one aspect, the base station may be a donor gNB-CU. Operations 700 may be implemented as software components that are executed and run on one or more processors (e.g., controller/processor). Further, the transmission and reception of signals by the vehicle relay in operations 700 may be enabled, for example, by one or more antennas). In certain aspects, the transmission and/or reception of signals by the base station may be implemented via a bus interface of one or more processors (e.g., controller/processor) obtaining and/or outputting signals.

The operations 700 may begin, at 702, where the base station receives first information from a (first) vehicle relay served by the base station via RRC signaling. The first information may include at least one of a location of another (second) vehicle relay, a speed of the other vehicle relay, or a direction of the other vehicle relay. The first information may be acquired by the (first) vehicle relay from the second vehicle relay via a sidelink used for communications between the first vehicle relay and the second vehicle relay. For example, the first vehicle relay 110t-1 may monitor information sent by neighboring vehicle relays over PC5 and report the information to the base station (e.g., via new DU-CU signaling).

At 704, the base station determines to handover a UE served by the (first) vehicle relay to the other (second) vehicle relay, based at least in part on the first information. At 706, the base station triggers a handover of the UE from the vehicle relay to the other vehicle relay, in response to the determination.

Figure 8:
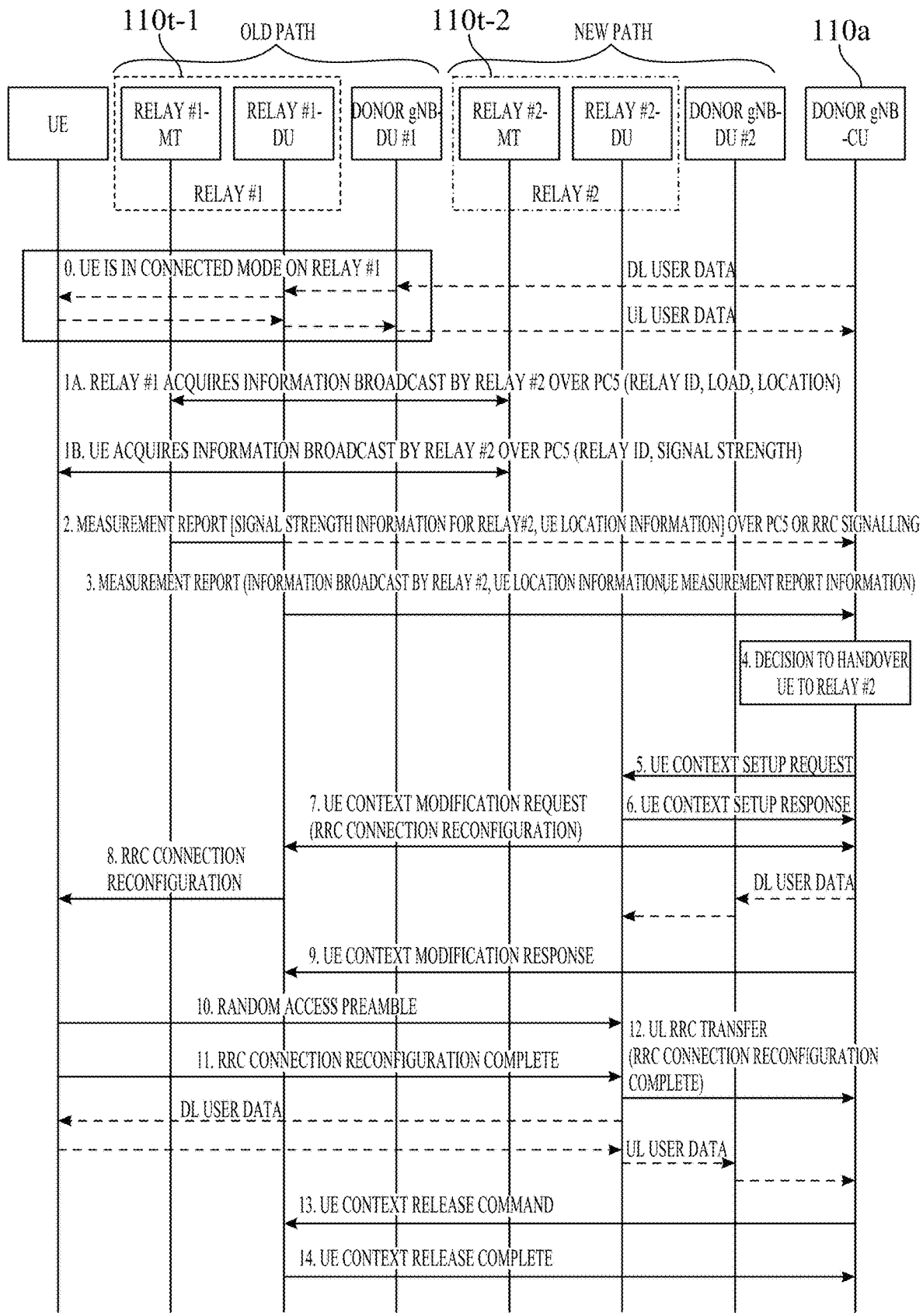
FIG. 8 depicts a call flow for triggering a UE handover by a donor base station, in accordance with certain aspects of the present disclosure.

FIG. 8 illustrates a call flow 800 for determining, at the donor base station (e.g., donor gNB-CU 102), to handover the UE to a target vehicle relay, in accordance with certain aspects of the present disclosure. Here, the steps 0, 1a, and 1b may be similar to steps 0, 1a, and 1b in FIGS. 6A-6B. At step 2, the UE sends a measurement report to the (target) vehicle relay 110t-2. The measurement report includes signal strength information (measured by the UE) for vehicle relay 110t-2 and/or UE location information. In one aspect, the UE may send the measurement report/UE location report to the donor gNB-CU 102 via RRC signaling (e.g., as illustrated via the dotted line at step 2). In one aspect, the UE may send the measurement report/UE location report to the serving vehicle relay to be forwarded to the donor gNB-CU 102 (e.g., via DU to CU signaling) (e.g., as shown in steps 2-3).

At step 4, the donor gNB-CU 102 determines to handover the UE to the vehicle relay 110t-2. For example, the donor gNB-CU may extrapolate the expected trajectory of neighboring relays that can serve new UEs. The extrapolation may be based on previous locations and known paths (e.g., street grid, bus routes, tramway tracks, etc.). The donor gNB-CU may also extrapolate the expected trajectory of the UE (e.g., based on previous locations reported by the UE). As noted, the UE location report can be sent via RRC signaling or via a PC5 link between the UE and vehicle relay 110t-1. In this latter case, the vehicle relay 110t-1 may feedback the information to the donor gNB-CU along with the information regarding the neighboring relay(s). The donor gNB-CU may make the handover decision based on the expected trajectory and speed of neighboring relay(s) that can serve new UEs, the expected trajectory and speed of the UE, and the neighboring relays and associated signal strength reported by the UE. For example, the donor gNB-CU may select the neighboring relay whose path will overlap with that of the UE for the longest duration. The handover of the UE may then be triggered by the donor gNB-CU using existing UE handover procedures (e.g., steps 5-14).

Figure 9:
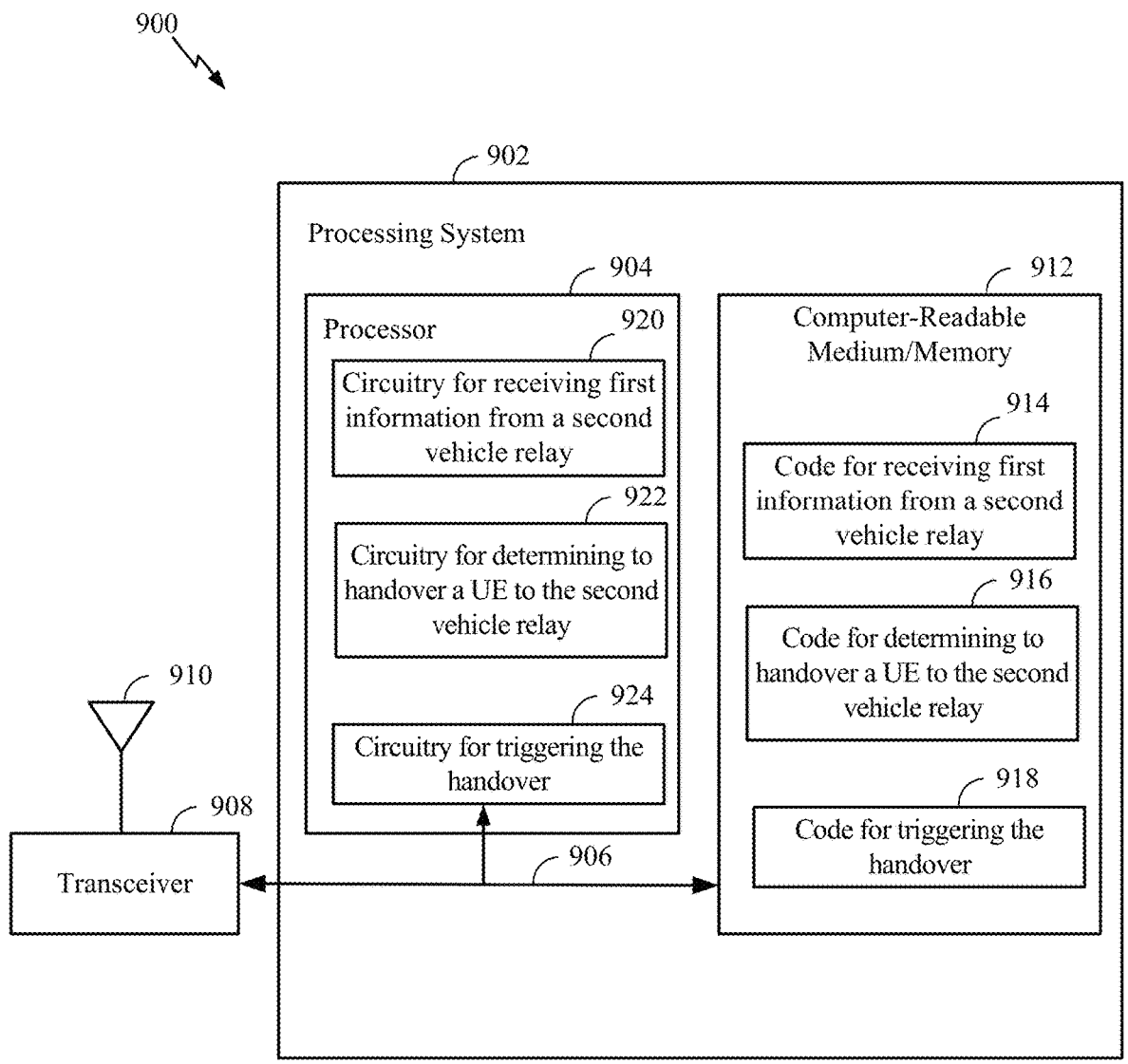
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 5. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 5, or other operations for performing the various techniques discussed herein. In certain aspects, computer-readable medium/memory 912 stores code 914 for receiving first information from a second vehicle relay via a sidelink; code 916 for determining to handover a UE to the second vehicle relay; and code 918 for triggering a handover of the UE to the second vehicle relay. In certain aspects, the processor 904 has circuitry configured to implement the code stored in the computer-readable medium/memory 912. The processor 904 includes circuitry 920 for receiving first information from a second vehicle relay via a sidelink; circuitry 922 for determining to handover a UE to the second vehicle relay; and circuitry 924 for triggering a handover of the UE to the second vehicle relay.

Figure 10:
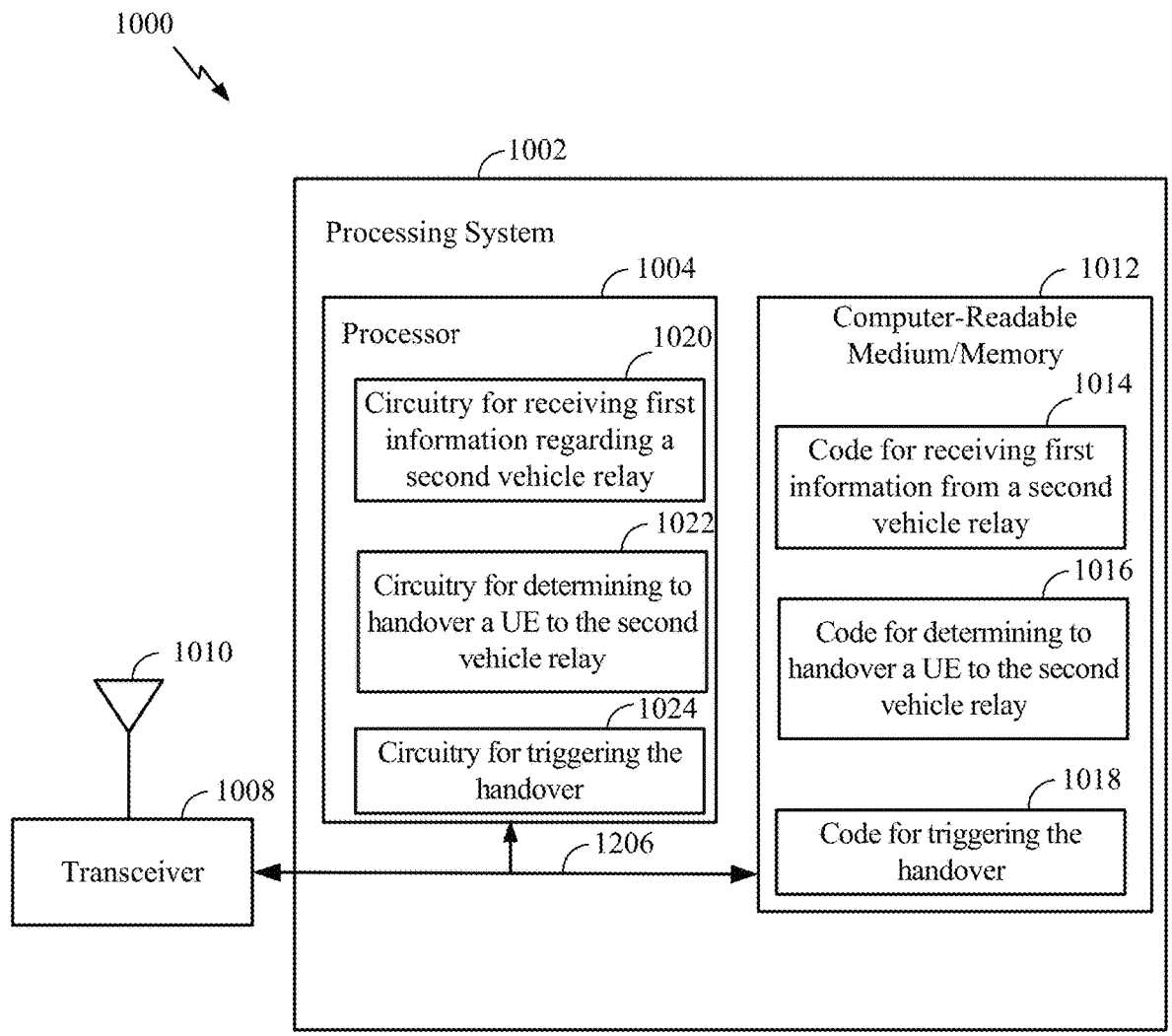
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7, or other operations for performing the various techniques discussed herein. In certain aspects, computer-readable medium/memory 1012 stores code 1014 for receiving from a first vehicle relay first information regarding a second vehicle relay, via RRC signaling; code 1016 for determining to handover a UE to the second vehicle relay; and code 1018 for triggering a handover of the UE to the second vehicle relay. In certain aspects, the processor 1004 has circuitry configured to implement the code stored in the computer-readable medium/memory 1012. The processor 1004 includes circuitry 1020 for receiving from a first vehicle relay first information regarding a second vehicle relay, via RRC signaling; circuitry 1022 for determining to handover a UE to the second vehicle relay; and circuitry 1024 for triggering a handover of the UE to the second vehicle relay.

Example Clauses

Implementation examples are described in the following numbered clauses:

Clause 1: A method for wireless communication by a first vehicle relay, comprising: receiving first information from at least one second vehicle relay via a sidelink for communications between the first vehicle relay and the at least one second vehicle relay, the first information comprising at least one of a location, a speed, or a direction of the at least one second vehicle relay; determining to handover a UE served by the first vehicle relay to the second vehicle relay, based at least in part on the first information; and triggering a handover of the UE from the first vehicle relay to the second vehicle relay, in response to the determination.

Clause 2: The method of Clause 1, wherein the sidelink comprises a PC5 interface.

Clause 3: The method of any of Clauses 1-2, wherein the first information further comprises at least one of an identifier of the at least one second vehicle relay, a load of the at least one second vehicle relay, or a travel path of the at least one second vehicle relay.

Clause 4: The method of any of Clauses 1-3, further comprising receiving, from the UE, second information comprising at least one of a location of the UE, a speed of the UE, a travel path of the UE, or a signal strength of the at least one second vehicle relay measured by the UE, wherein determining to handover the UE to the second vehicle relay is further based at least in part on the second information.

Clause 5: The method of Clause 4, wherein the second information is received via a sidelink for communications between the UE and the first vehicle relay or via radio resource control (RRC) signaling.

Clause 6: The method of any of Clauses 1-5, further comprising configuring the UE to measure the signal strength of the at least one second vehicle relay, based on the first information.

Clause 7: The method of any of Clauses 4-6, further comprising: determining a first trajectory of the at least one second vehicle relay, based on the first information; and determining a second trajectory of the UE, based on the second information, wherein determining to handover the UE to the second vehicle relay is further based at least in part on the first trajectory and the second trajectory.

Clause 8: The method of Clause 7, wherein determining to handover the UE to the second vehicle relay comprises determining that an overlap between the first trajectory and the second trajectory satisfies a predetermined condition.

Clause 9: The method of any of Clauses 1-8, wherein triggering the handover of the UE from the first vehicle relay to the second vehicle relay comprises sending a handover request to a control unit of a donor base station.

Clause 10: The method of any of Clauses 1-9, wherein triggering the handover of the UE from the first vehicle relay to the second vehicle relay comprises sending a handover notification message to the second vehicle relay via the sidelink.

Clause 11: The method of any of Clauses 1-10, wherein triggering the handover of the UE from the first vehicle relay to the second vehicle relay comprises: generating, at the first vehicle relay, a radio resource control (RRC) connection reconfiguration message; and transmitting the RRC connection reconfiguration message to the UE.

Clause 12: An apparatus comprising a processing system, a receiver, and a transmitter, the apparatus being configured to perform the method of any of Clauses 1-11.

Clause 13: An apparatus comprising means for performing the method of any of Clauses 1-11.

Clause 14: A non-transitory computer-readable medium by a first vehicle relay, the non-transitory computer-readable medium comprising computer-executable instructions that, when executed by one or more processors of a processing system, cause the first vehicle relay to perform the method of any of Clauses 1-11.

Clause 15: A computer program product for wireless communication by a first vehicle relay embodied on a computer-readable storage medium, the computer-readable storage medium comprising code for performing the method of any of Clauses 1-11.

Clause 16: A method for wireless communication by a base station, comprising: receiving first information from a first vehicle relay served by the base station via RRC signaling, the first information comprising at least one of a location, a speed, or a direction of a second vehicle relay served by the base station, wherein the first information was acquired by the first vehicle relay from the second vehicle relay via a sidelink for communications between the first vehicle relay and the second vehicle relay; determining to handover a UE served by the first vehicle relay to the second vehicle relay, based at least in part on the first information; and triggering a handover of the UE from the first vehicle relay to the second vehicle relay, in response to the determination.

Clause 17: The method of Clause 16, wherein the sidelink comprises a PC5 interface.

Clause 18: The method of any of Clauses 16-17, wherein the first information further comprises at least one of an identifier of the second vehicle relay, a load of the second vehicle relay, or a travel path of the second vehicle relay.

Clause 19: The method of any of Clauses 16-18, further comprising receiving second information comprising at least one of a location of the UE, a speed of the UE, a travel path of the UE, or a signal strength of the second vehicle relay measured by the UE, wherein determining to handover the UE to the second vehicle relay is further based at least in part on the second information.

Clause 20: The method of Clause 19, wherein the second information is received from the UE via radio resource control (RRC) signaling.

Clause 21: The method of Clause 19, wherein the second information is received by the first vehicle relay from the UE via the sidelink and sent by the first vehicle relay to the base station via radio resource control (RRC) signaling.

Clause 22: The method of any of Clauses 19-21, further comprising: determining a first trajectory of the second vehicle relay, based on the first information; and determining a second trajectory of the UE, based on the second information, wherein determining to handover the UE to the second vehicle relay is further based at least in part on the first trajectory and the second trajectory.

Clause 23: The method of Clause 22, wherein determining to handover the UE to the second vehicle relay comprises determining that an overlap between the first trajectory and the second trajectory satisfies a predetermined condition.

Clause 24: An apparatus comprising a processing system, a receiver, and a transmitter, the apparatus being configured to perform the method of any of Clauses 16-23.

Clause 25: An apparatus comprising means for performing the method of any of Clauses 16-23.

Clause 26: A non-transitory computer-readable medium by a base station, the non-transitory computer-readable medium comprising computer-executable instructions that, when executed by one or more processors of a processing system, cause the base station to perform the method of any of Clauses 16-23.

Clause 27: A computer program product for wireless communication by a base station embodied on a computer-readable storage medium, the computer-readable storage medium comprising code for performing the method of any of Clauses 16-23.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5, 6A, 6B, 7, and/or 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a first vehicle relay, the method comprising:
   receiving first information from at least one second vehicle relay via a sidelink for communications between the first vehicle relay and the at least one second vehicle relay, the first information comprising at least one of a location, a speed, or a direction of the at least one second vehicle relay, the first vehicle relay comprising a first distributed unit (DU) mounted to a first vehicle and the second vehicle relay comprising a second DU mounted to a second vehicle;
   receiving second information, from a user equipment (UE) served by the first vehicle relay, via an access link or a link, the second information comprising at least one of a location of the UE, a speed of the UE, a travel path of the UE, or a signal strength of the at least one second vehicle relay measured by the UE;
   determining to handover the UE to the second vehicle relay based at least in part on the first information and the second information; and
   sending a message, to the second vehicle relay or to a central unit (CU) of a donor base station, to trigger the handover of the UE from the first vehicle relay to the second vehicle relay, in response to the determination.

2. The method of claim 1, wherein the sidelink comprises a PC5 interface.

3. The method of claim 1, wherein the first information further comprises at least one of an identifier of the at least one second vehicle relay, a load of the at least one second vehicle relay, or a travel path of the at least one second vehicle relay.

4. The method of claim 1, further comprising configuring the UE to measure the signal strength of the at least one second vehicle relay, based on the first information.

5. The method of claim 1, further comprising:
   determining a first trajectory of the at least one second vehicle relay based on the first information; and
   determining a second trajectory of the UE based on the second information, wherein determining to handover the UE to the second vehicle relay is based at least in part on the first trajectory and the second trajectory.

6. The method of claim 5, wherein determining to handover the UE to the second vehicle relay comprises determining that an overlap between the first trajectory and the second trajectory satisfies a predetermined condition.

7. The method of claim 1, wherein sending the message to trigger the handover of the UE from the first vehicle relay to the second vehicle relay comprises sending a handover request to the CU the donor base station.

8. The method of claim 1, wherein sending the message to trigger the handover of the UE from the first vehicle relay to the second vehicle relay comprises sending a handover notification message to the second vehicle relay via the sidelink.

9. The method of claim 8, further comprising:
   generating, at the first vehicle relay, a radio resource control (RRC) connection reconfiguration message; and
   transmitting the RRC connection reconfiguration message to the UE.

10. An apparatus, comprising:
    a memory comprising computer-executable instructions; and
    one or more processors configured to, individually or collectively, execute the computer-executable instructions and cause the apparatus to:
      receive first information from at least one vehicle relay via a sidelink for communications between the apparatus and the at least one vehicle relay, the first information comprising at least one of a location, a speed, or a direction of the vehicle relay, the apparatus comprising a first distributed unit (DU) mounted to a first vehicle and the vehicle relay comprising a second DU mounted to a second vehicle;
      receive second information, from a user equipment (UE) served by the apparatus, via an access link or a link, the second information comprising at least one of a location of the UE, a speed of the UE, a travel path of the UE, or a signal strength of the vehicle relay measured by the UE;
      determine to handover the UE to the vehicle relay based at least in part on the first information and the second information; and
    send a message, to the at least one vehicle relay or to a central unit (CU) of a donor base station, to trigger the handover of the UE from the apparatus to the vehicle relay, in response to the determination.

11. The apparatus of claim 10, wherein the sidelink comprises a PC5 interface.

12. The apparatus of claim 10, wherein the first information further comprises at least one of an identifier of the vehicle relay, a load of the vehicle relay, or a travel path of the vehicle relay.

13. The apparatus of claim 10, wherein the one or more processors are configured to cause the apparatus to configure the UE to measure the signal strength of the vehicle relay, based on the first information.

14. The apparatus of claim 10, wherein the one or more processors are configured to cause the apparatus to:
determine a first trajectory of the vehicle relay based on the first information;
determine a second trajectory of the UE based on the second information; and
determine to handover the UE to the vehicle relay further based at least in part on the first trajectory and the second trajectory.

15. The apparatus of claim 14, wherein the one or more processors are configured to cause the apparatus to determine to handover the UE to the vehicle relay based on a determination that an overlap between the first trajectory and the second trajectory satisfies a predetermined condition.

16. The apparatus of claim 10, wherein the message to trigger the handover of the UE from the apparatus to the vehicle relay comprises a handover request.

17. The apparatus of claim 10, wherein the one or more processors are configured to cause the apparatus to:
generate a radio resource control (RRC) connection reconfiguration message; and
transmit the RRC connection reconfiguration message to the UE.

18. A method for wireless communication by a base station, the method comprising:
receiving, at a central unit (CU) of the base station, first information from a first vehicle relay via an access link, the first information comprising at least one of a location, a speed, or a direction of a second vehicle relay, the first vehicle relay comprising a first distributed unit (DU) mounted to a first vehicle and the second vehicle relay comprising a second DU mounted to a second vehicle;
receiving, at the CU of the base station, second information, from the first vehicle relay or from a user equipment (UE) served by the first vehicle relay, the second information comprising at least one of a location of the UE, a speed of the UE, a travel path of the UE, or a signal strength of the second vehicle relay measured by the UE;
determining, at the CU of the base station, to handover the UE to the second vehicle relay based at least in part on the first information and the second information; and
triggering a handover of the UE from the first vehicle relay to the second vehicle relay in response to the determination.

19. The method of claim 18, wherein the first information further comprises at least one of an identifier of the second vehicle relay, a load of the second vehicle relay, or a travel path of the second vehicle relay.

20. The method of claim 18, wherein the second information is received from the UE.

21. The method of claim 18, wherein the second information is received from the first vehicle relay.

22. The method of claim 18, further comprising:
determining a first trajectory of the second vehicle relay based on the first information; and
determining a second trajectory of the UE based on the second information, wherein determining to handover the UE to the second vehicle relay is based at least in part on the first trajectory and the second trajectory.

23. The method of claim 22, wherein determining to handover the UE to the second vehicle relay comprises determining that an overlap between the first trajectory and the second trajectory satisfies a predetermined condition.

24. An apparatus, comprising:
a memory comprising computer-executable instructions; and
one or more processors configured to, individually or collectively, execute the computer-executable instructions and cause the apparatus to:
receive first information from a first vehicle relay via an access link, the first information comprising at least one of a location, a speed, or a direction of a second vehicle relay, the first vehicle relay comprising a first distributed unit (DU) mounted to a first vehicle and the second vehicle relay comprising a second DU mounted to a second vehicle;
receive second information, from the first vehicle relay or from a user equipment (UE) served by the first vehicle relay, the second information comprising at least one of a location of the UE, a speed of the UE, a travel path of the UE, or a signal strength of the second vehicle relay measured by the UE;
determine to handover the UE to the second vehicle relay based at least in part on the first information and the second information; and
trigger a handover of the UE from the first vehicle relay to the second vehicle relay in response to the determination.

* * * * *